US007299542B2

(12) United States Patent
Montena

(10) Patent No.: US 7,299,542 B2
(45) **Date of Patent: *Nov. 27, 2007**

(54) MULTIPLE CONNECTOR COMPRESSION TOOL

(75) Inventor: Noah P. Montena, Syracuse, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 11/301,896

(22) Filed: Dec. 13, 2005

(65) Prior Publication Data

US 2007/0130757 A1 Jun. 14, 2007

(51) Int. Cl.
*B23P 19/00* (2006.01)

(52) U.S. Cl. ............................ 29/751; 29/748; 29/750

(58) Field of Classification Search .................. 29/748, 29/750, 751
See application file for complete search history.

(56) References Cited

U.S. PATENT DOCUMENTS 5,392,508 A * 2/1995 Holliday et al. .............. 29/751
5,647,119 A * 7/1997 Bourbeau et al. ............. 29/751

* cited by examiner

*Primary Examiner*—Carl J. Arbes
(74) *Attorney, Agent, or Firm*—Schmeiser, Olsen & Watts

(57) ABSTRACT

A multiple connector compression tool for use with multiple sized connectors and a cable is disclosed. The tool is designed to receive at least two different connector configurations. The tool does not require using adaptors which may be lost or misplaced. The tool has a long life because there are very few wear items while maintaining the ability to produce different connectors.

16 Claims, 6 Drawing Sheets

MULTIPLE CONNECTOR COMPRESSION TOOL

CROSS-REFERENCE TO RELATED APPLICATIONS

This application is related to Ser. No. 11/302,478, entitled Multiple Connector Compression Tool and Method, filed on Dec. 13, 2005 and is hereby incorporated by reference.

FIELD OF INVENTION

The present invention relates to compression tools for attaching connectors onto wires, cables and the like. More particularly, the present invention relates to a compression tool for use with multiple sized connectors and related method of affixing a connector to a cable or wire.

BACKGROUND

The electronics, telecommunications, and cable television industries have used a variety of cables and wires to perform various jobs. Each cable or wire has various size and shaped connectors based upon either an industry standard or in some cases a proprietary manufacturing standard. The industry has used compression tools to attach various size and types of connectors onto wires. The norm has been to use a compression tool having a universal compression head and then attaching an appropriate adapter to attach a connector of a specific length, diameter or other dimension.

This type of compression tool with an adjustable adapter to vary connector size is compact because it is designed to fit only one connector at a time. This is great for ease of handling and storage. Initially, in the early stages of a universal compression tool's life span the tool works as intended, but there are many drawbacks as the tool ages. One drawback is that the adapters can be lost or damaged. Another drawback is that depending on the design the additional moving parts create wear, looseness of the insert and eventual failure of the compression tool. The instant invention addresses the abovementioned drawbacks of the universal connector compression tool.

SUMMARY OF THE INVENTION

A compression tool for at least two different sizes of connectors without using adaptors to prevent premature wear and looseness of the mechanism. A first aspect of this multiple connector compression tool for use with multiple sized connectors and a cable, said compression tool comprising a body having a bottom surface, a first side and a second side; an actuator movably affixed to the body; a first compression chamber, positioned proximate a first side and configured for receiving a first cable connector of a first dimension; a second compression chamber, positioned proximate a second side and configured for receiving a second cable connector of a second dimension, said second cable connector being a different dimension than the first cable connector; and a first cable receiving portion, operably associated with the first compression chamber, wherein when a coaxial cable is positioned in the first cable receiving portion, a connector of a first dimension may be compressed thereon by movement of the actuator; and a second cable receiving portion, operably associated with the second compression chamber, wherein when a coaxial cable is positioned in the second cable receiving portion, a connector of a first dimension may be compressed thereon by movement of the actuator.

A second aspect of this invention is a universal tool for multiple connector sizes comprising a body having a bottom surface, a first side and a second side, each side having a guidance portion therein; a handle pivotally attached to the body between the first side and the second side; a sliding head having a protruding component, wherein the protruding component of the sliding head is both retained and movable within the guidance portion of the body; a toggle lever operably coupled to the to the handle and the sliding head; an first portion of the sliding head, for receiving a driver tip, for a connector of a first dimension; a second portion of the sliding head, for receiving a driver tip, for a connector of a second dimension different than the first dimension; and a cable cradle having a first portion and a second portion, wherein the cradle is affixed to the body between the first side and the second side and the portions reside in a plane substantially parallel with the bottom surface.

A method of affixing a cable connector to a wire comprising the steps of providing a body having a bottom surface, a first side and a second side, a handle attached to the body, a sliding head having a protruding component that is slidably affixed to the body and is configured to be coupled to the handle, a first compression portion for receiving a driver tip for a connector of a first dimension, a second compression portion of the sliding head for receiving a driver tip for a connector of a second dimension larger than the first dimension, and a cable cradle affixed to the body, wherein includes a first portion and a second portion both residing substantially parallel with the bottom surface; providing a cable connector; providing a wire; inserting the cable connector and the wire onto the appropriately sized driver tip in the body; moving the sliding head to drive the cable connector onto the wire forming a connector cable; and, removing the connector cable from the body.

BRIEF DESCRIPTION OF DRAWINGS

The examples shown in the drawings are not intended to limit the scope of the claims and are just one possible manner of assembling the elements of the claimed features. One skilled in the art could prepare many examples that are equivalent in structure and performance to the claimed invention, but that they may differ visually while still performing the same function are still intended to be within the scope of the invention.

DETAILED DESCRIPTION OF THE INVENTION

Figure 1:
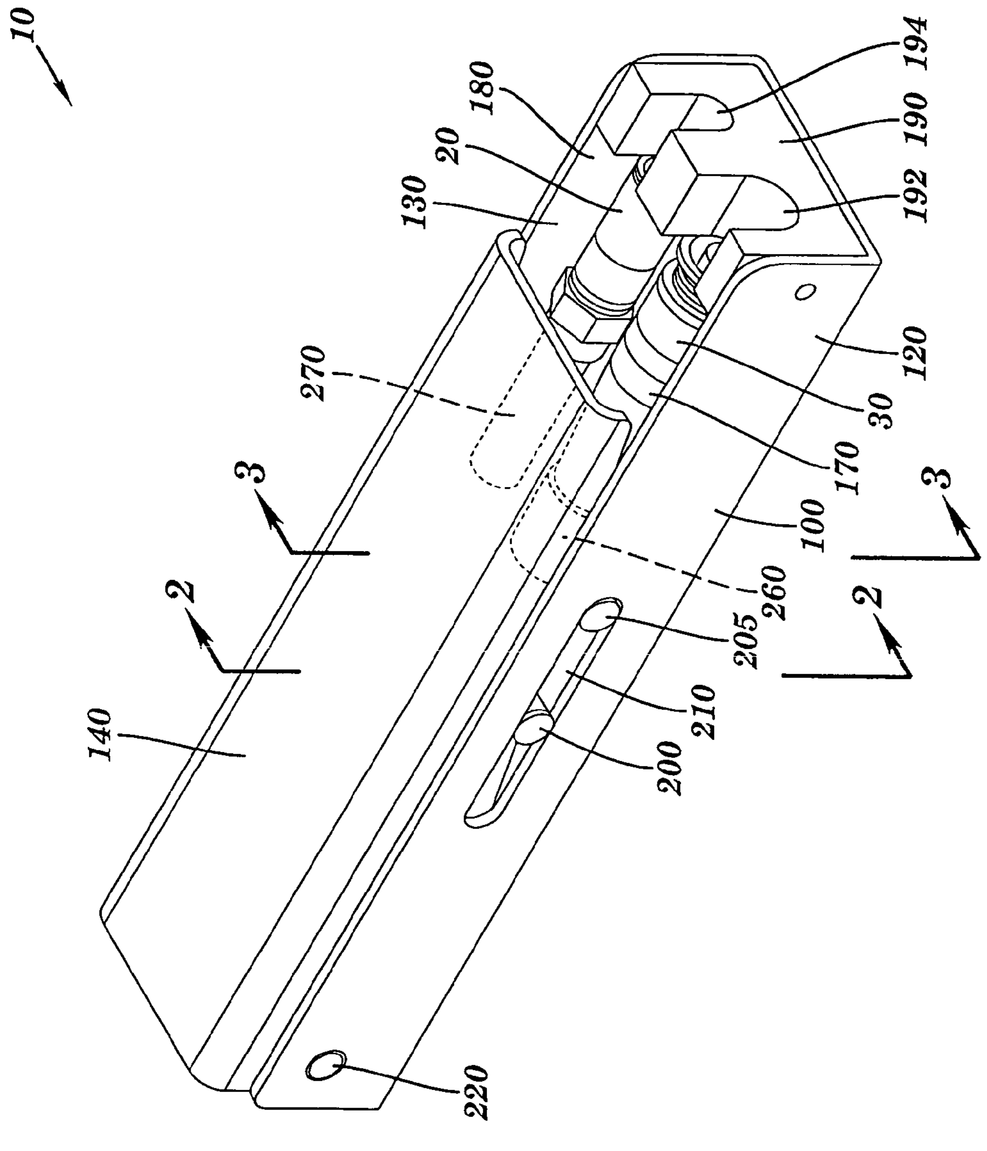
FIG. 1 displays a top perspective view of the first end of the tool.

A multiple connector size compression tool 10 for at least two or more different sized or types of connectors is shown in FIGS. 1-6. The compression tool 10 can be used while handheld or while resting on a surface, such as a table. The compression tool 10 has horizontally offset connectors 20, 30 within the body 100 to give the tool 10 a broad base that is ideal for easy mounting onto workstations or tables. Alternatively, the connectors 20, 30 may be referred to as adapters, couplers, or fastener members or devices. The configuration for receiving the connectors 20, 30 is permanently designed into the compression mechanism of the tool 10 to prevent the previous deficiencies such as looseness or misplacement of the adapters to fit various sizes. This allows for a simple tool with adaptability for multiple connectors without the problems associated with a unit designed for all possible connectors.

As displayed in FIGS. 1-4 the tool 10 may comprise a body 100 having a bottom surface, base, footing, support, or underside 110, a first side, lateral portion or first side wall 120 and a second side, lateral portion or second side wall 130. Attached to the body 100 may be an actuator, lever or handle 140 having any means of moving or axially sliding the sliding head 160 forward or toward the cable cradle 190 with devices such as hydraulics, electronics or a mechanical advantage device such as a gear, screw, lever or handle. A handle 140 operable coupled to a toggle lever 240 at toggle handle protrusion 212 is depicted as one embodiment to the sliding head 160 at toggle slider protrusion 205 that affixes both the sliding head 160 and the toggle lever 240 into the guidance portion 210. The lever or handle 140 may have a material used for a grip or other ergonomic design (not shown) for ease of handling and comfort of the user. The lever or handle 140 may be movably attached to the sides or walls 120, 130 of the body 100 by any of a number of devices such as a bar, catch, coupling, dowel, fastener, key, lag, latch, peg, pin, rivet, rod, screw, skewer, sliding bar, spike, staple, or stud. The body 100 could be any rigid material such as metal, composites, polymers or plastic that will not torsionally flex during the compression process. The body 100, may be stamped, cut, shaped, finished, machined, forged, cold worked, heat treated or assembled with conventional fasteners, such as stamps, welds, adhesive, rivets, pins, screws, nails and the like. If made of a plastic, polymer or composite the body may be molded and either adhered or glued, welded or mechanically or chemically fastened together. The tool is not limited to any specific material as long as it is sufficiently stiff to prevent flexing or breaking of the body 100 for a period of time to permit a useful life of the tool. A first cable connector 30 and a second cable connector 20 are shown within the compression tool 10.

Figure 2:
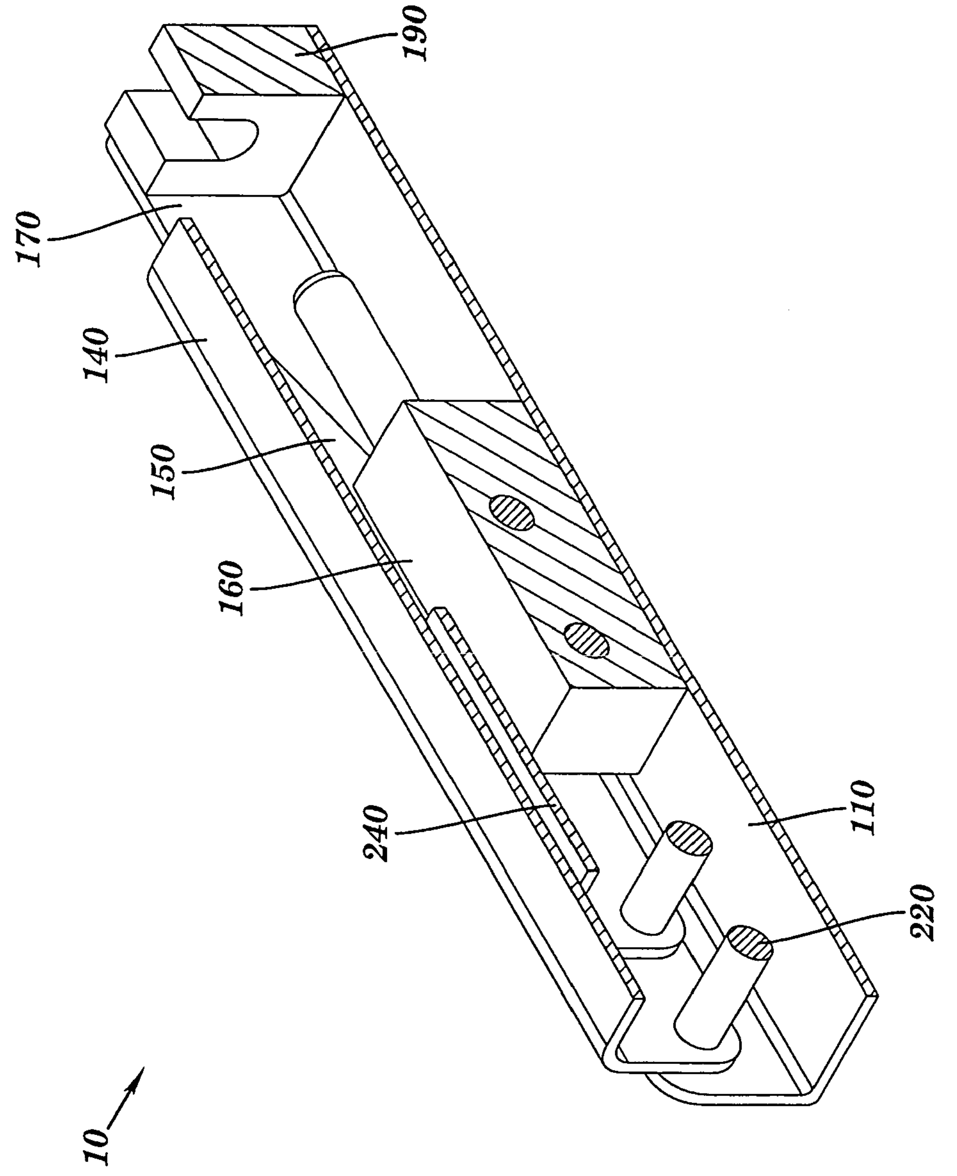
FIG. 2 displays a cross-sectional side perspective view of the tool.
Figure 3:
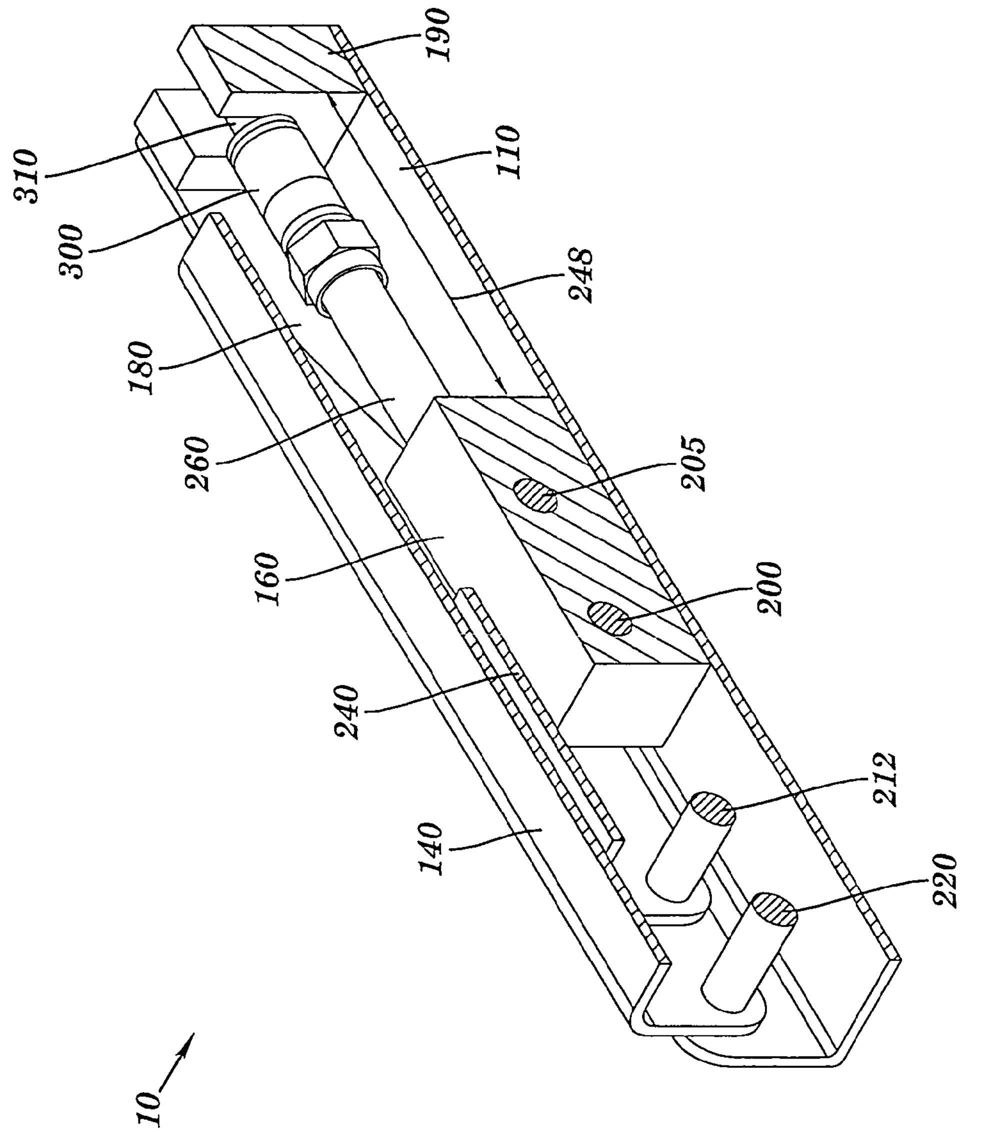
FIG. 3 displays a cross-sectional side perspective view of the tool with a connector end.
Figure 4:
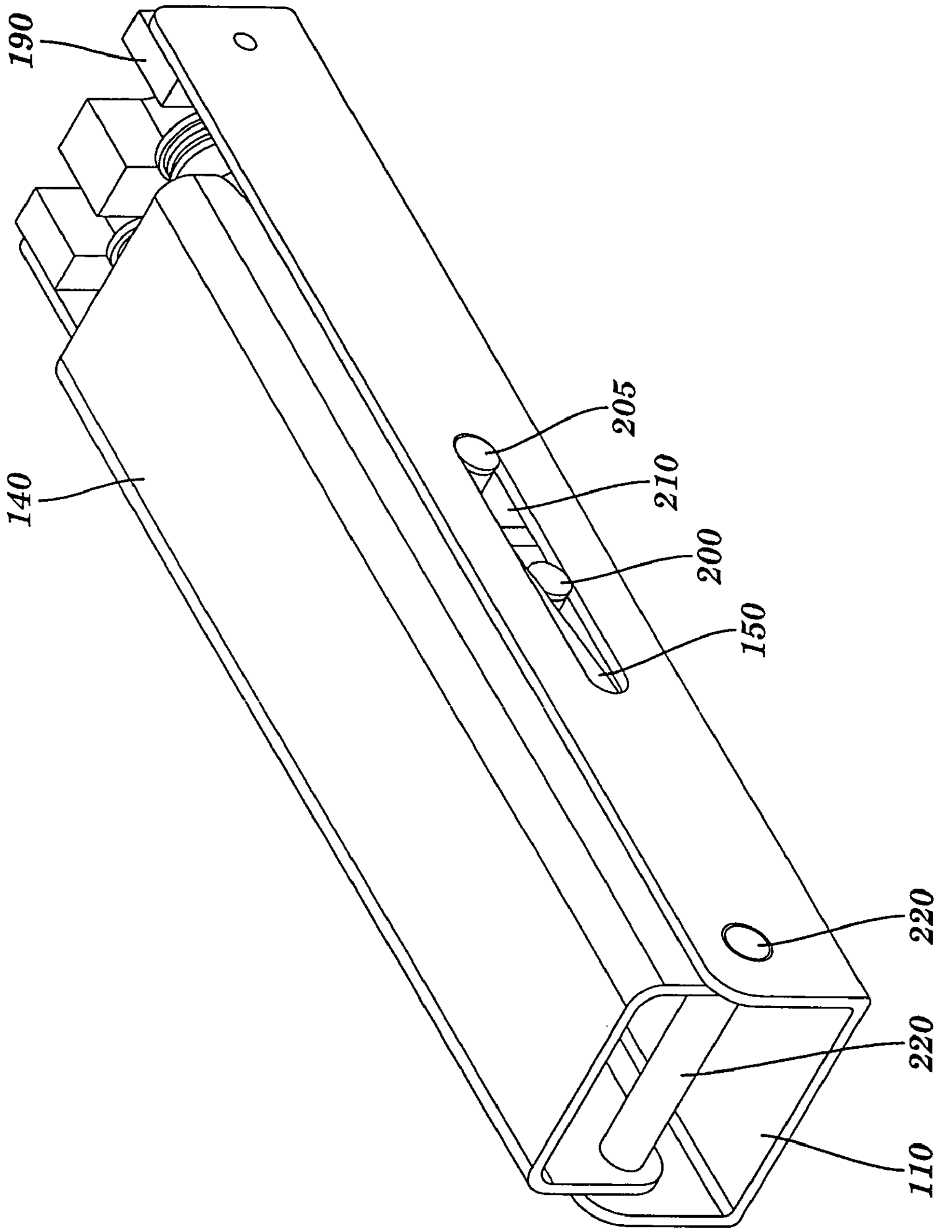
FIG. 4 displays a top perspective view of the second end of the tool.
Figure 5:
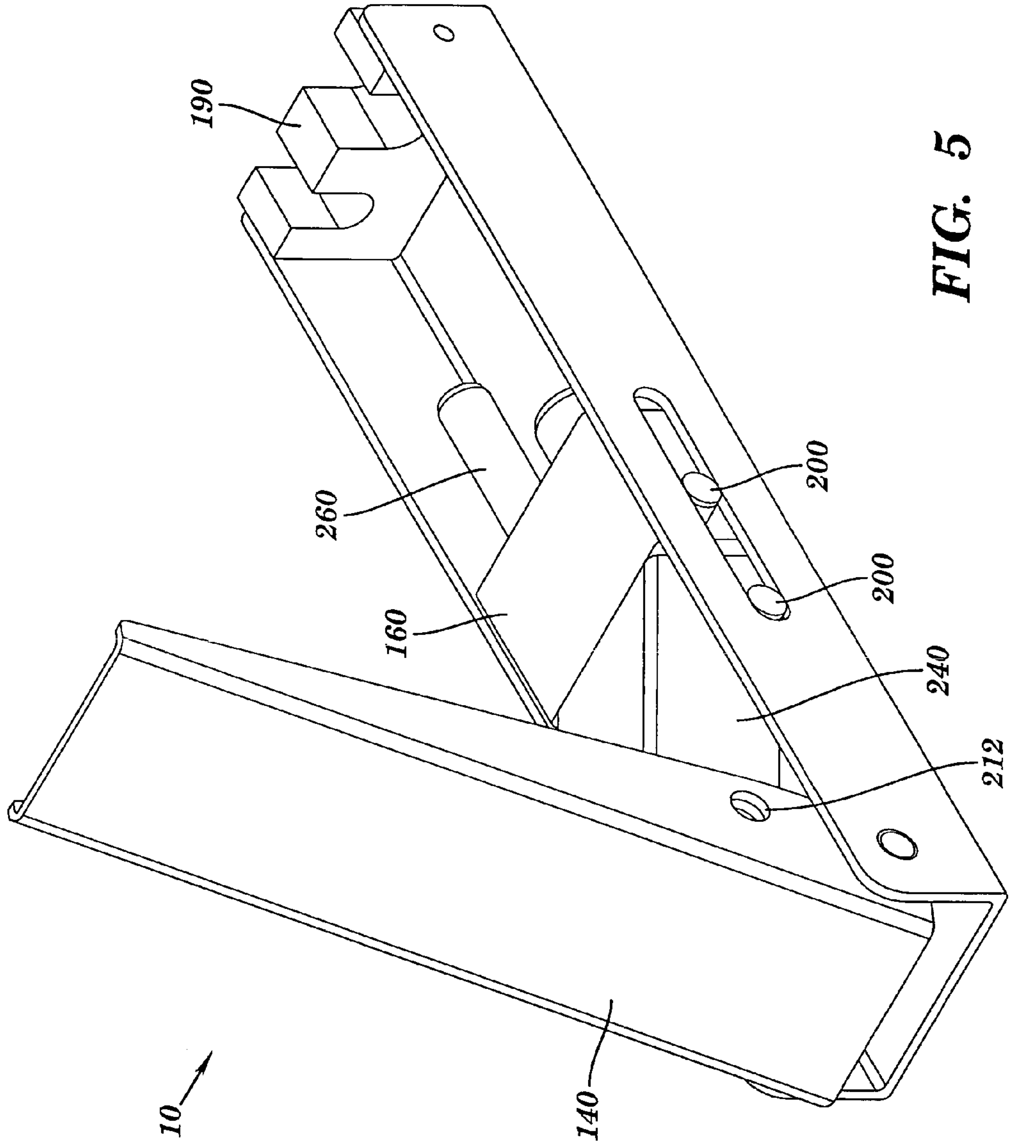
FIG. 5 displays a top perspective view of the second end of the tool with the handle raised.
Figure 6:
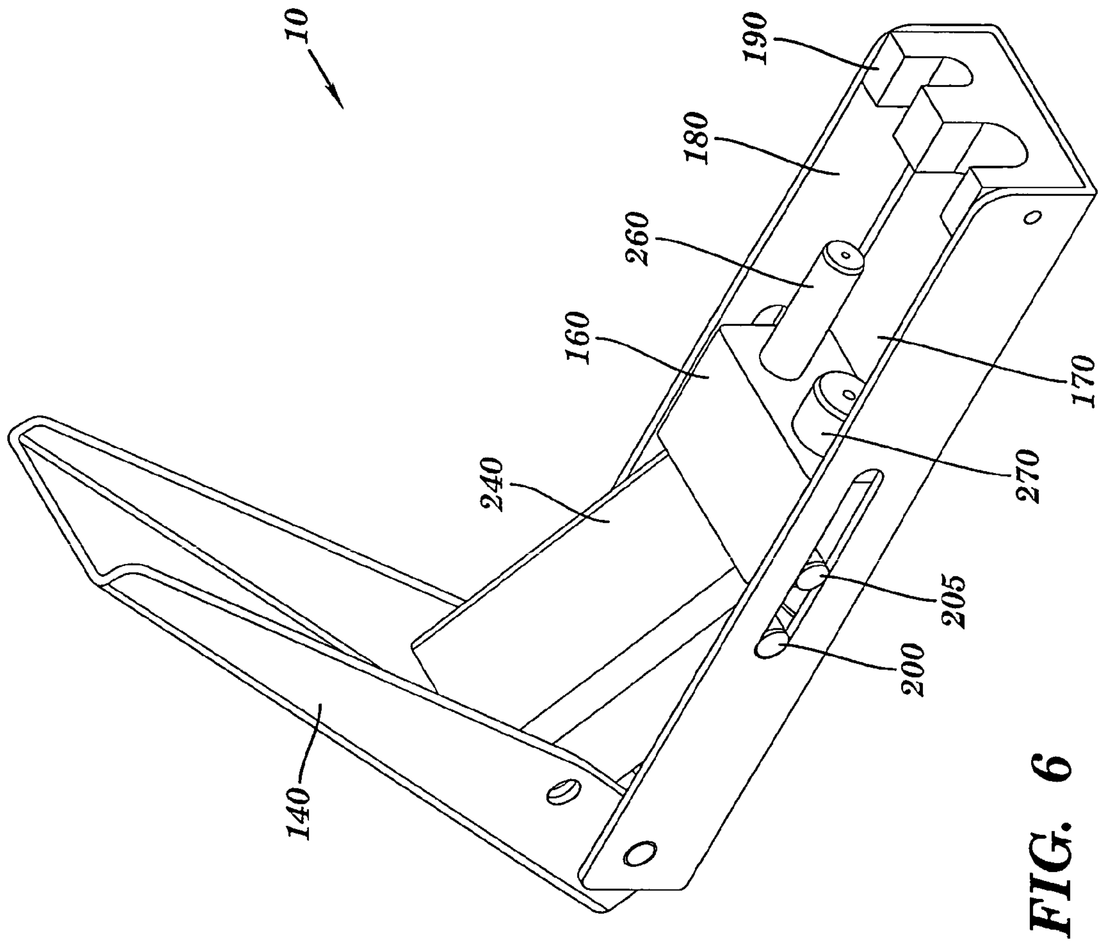
FIG. 6 displays a top perspective view of the first end of the tool with the handle raised.

FIGS. 2 and 3 display a sliding head 160, wherein the head may be movably affixed to the body 100 and attached to either the first side wall 120 and/or the second side wall 130 or the bottom 110 of the body 100 and configured to couple with the handle 140 or alternatively it can be moved by an actuating member 240 that provides the benefit of retraction the sliding head 160. The sliding head 160 interacts with the body 100 of the tool to compress the connector body onto the wire or cable. In the depicted embodiment, the wire or cable is inserted when the handle 140 is raised sufficiently to allow the sliding head 160 to move into an uncompressed position of a volume large enough to encompass the uncompressed connector.

The body 100 in conjunction with the sliding head 160 may form a first compression chamber 170 adjacent to the first side wall 120 configured for receiving a connector or a first cable connector of a first dimension 30. Moreover, the body 100 in conjunction with the sliding head 160 may form a second compression chamber 180 adjacent to the second side wall 130 of the body 100 for receiving a connector or a second cable connector 20 of a second dimension different than the first dimension. Adjacent to the compression chambers 170, 180 may be a cable cradle or receiving member 190 having a first cable receiving portion 192 adjacent to the first wall 120 and a second cable receiving portion 194 adjacent to the second wall 130, wherein the cable cradle 190 may be affixed to the body 100 and the receiving portions reside in a plane substantially parallel with the bottom surface 110. It should be understood that although a cradle is depicted other shapes and devices may be within the purview of the present invention such as a fastener, catch, clasp, grip, lock, snap, vice, clamp, hole, guide, opening, aperture, cavity, chamber, cleft, cut, dent, depression, dimple, dip, gap, keyhole, lacuna, notch, orifice, outlet, or passage. The importance of the cradle 190 is for the purpose of holding or guiding the cable or wire during assembly of the connector. This side-by-side or parallel arrangement of the cable cradle 190 to the handle is designed for reduced height for maximum stability when it is rested upon or attached to a relatively flat horizontal surface such as a table during the compression process, but it may also be compressed while being held by the user. The cable cradle 190 has cable receiving portions of that are designed to line up with the compression chambers.

The sliding head 160 interacts with the body 100 of the tool to compress the connector body onto the wire or cable inserted. The cable can be inserted into the chamber through the cable cradle 190 when the handle 140 is raised allowing the sliding head 160 to move into an uncompressed position. To move the sliding head 160 a protruding component 200, 205 extends either from or into the sliding head 160 and may be configured to contact with the toggle lever 240 and/or the handle 140. Contact may also alternatively be with the angled portion 150 of the handle 140 or the toggle lever or actuating member 240 may force the sliding head 160 to move towards the cable cradle 190 and cause the connector to compress onto the wire thus forming a connector cable. To guide and align the sliding head 160 a receiving portion 220 may be present within at least one side wall 120, 130 of the body 100 that may accept the protruding component 200 extending from the sliding head 160. The angled portion 150 of the handle 140 may interact with a hinge 220 that pivotally affixes the handle 140 to the body 100. This combination of angle and pivot may drive the sliding head 160 forward in a relatively linear manner when the handle 140 is closed against the body 100.

To accomplish the task of providing a tool for at least two or more connectors without the drawbacks of adaptors the sliding head 160 in combination may define a first compressed length 235 that corresponds to the first compression channel portion 170 of the body 100. Also formed is at least a second compressed length 248 that may correspond to the second compression channel portion 180 of the body 100. Therefore the dimension of the sliding head 160 relative to the position in the body 100 may determine the size of the connector that may be compressed onto a wire and not an adaptor that can loosen over time. The cable cradle 190 may also be shaped to effect the volume of the compression chambers by varying the distance between the cable cradle 190 and the sliding head 160.

Another optional feature that can assist in the control of the size of the connector may be the guidance portion 210 to prevent over compression of the connectors when it hits the protrusion 200, 205 on the sliding head 160 that may block further travel in the extreme of either direction.

To ensure proper alignment during compression and to protect the center conductor from crushing in a connector or a wire, a driver tip may optionally be incorporated into the tool. Each connector may have a driver tip to fit the specific type of connector so that there may be a first driver tip 260 for the first compression channel portion 170 of the sliding head for receiving the connector of the first dimension and a second driver tip 270 for the second compression channel portion 180 of the sliding head for receiving the connector of the second dimension.

Another embodiment for the universal tool for multiple connector sizes may comprise a body 100 having a bottom surface 110, a first side 120 and a second side 130 each side having a guidance portion 210 therein to promote stability of the tool during compression of the connector. The tool may have a handle 140 pivotally attached to the body 100 between the first side 120 and the second side 130.

As shown in FIGS. 2 and 3 a sliding head 160 having a protruding component 200, wherein the protruding component 200 of the sliding head 160 may be both retained and movable within the guidance portion 210 of the body 160. This guidance portion 210 can be a groove, a slot, a linear depression, a raised lip, sliding bar, screw or any other surface that would mechanically retain the protruding component 200 while allowing both movability of the sliding head 160 in conjunction with relatively linear guidance to prevent damage to connector during compression due to misalignment. Conversely one skilled in the art may place the guidance portion 210 into the sliding head 160 and place the protruding component 200 onto the body 100.

To move the sliding head 160 optionally a toggle lever 240 may be affixed to the handle 140 that is coupled in turn with the sliding head 160. The toggle lever 240 may hit the end of the guidance portion 210 to limit the travel of the sliding head 160. The stop could be the sliding head 160 itself or it could be an addition feature added like an adjustable threaded screw to adjust the specific point of contact. Another option is to incorporate the toggle lever 240 directly into the handle 140 and have either the sliding head 160 or the body 100.

Other features shown in FIGS. 2 and 3 may include a first portion of the sliding head 160 for receiving a driver tip 260 for a connector 300 of a first dimension and a second portion of the sliding head 160 for receiving a driver tip 260 for a connector 310 of a second dimension different than the first dimension. The driver tip can be either an integral part of the sliding head 160 or it can be a replaceable part if wear or damage occurs. The driver tip 260, 270 is dimensioned to fit within the end of the specific connector 300 being compressed onto a wire 310. The drivers tip 260, 270 has an interior portion that would accept the electrode or center part of a cable so it is either a hollow rigid tube or a solid rod like shaft with a central hole of sufficient diameter to receive the conductor. The drivers tip could also cover additional portions of the connector to protect the conductor and transfer force to the connector.

FIG. 1 shows a cable cradle 190 having a first portion 192 and a second portion 194, wherein the cradle 190 may be affixed to the body 100 between the first side 120 and the second side 130 and the portions reside in a plane substantially parallel with the bottom surface 110. The cable cradle 190 may serve various purposes for the tool including inter alia alignment of the wire or cable 310 and restraint of the connector 300 during the compression process. The portions 192, 194 of the cable cradle 190 may be configured to have a diameter that allows the wire or cable 310 to pass to the connector 300, but may also be configured to have a diameter that is less than that of the compression sleeve of the connector 300 that drives the connector onto the retaining ring through movement of the sliding head 160. Optionally a bearing 215 can be disposed over the protruding component 200 of the sliding head 160 within the guidance portion 210 that is a groove, guide, slot, a ridge, opening, aperture, channel, cut, groove, hole, recess, slit, socket, space, channel or other relatively straight surface to catch, retain and guide the protruding component 200 for the entirety of the range of motion of the sliding head 160.

The size of the connector relates to the size of the chambers in the tool in that a first compressed length 235 may correspond to a first compression channel portion 170 of the body 100 in conjunction with the head 160 and a second compressed length 265 may correspond to the second compression channel portion 180 of the head. The compressed length 235, 248 is the size of the chamber when the handle 140 has reached its limit of travel also stopping any further movement of the sliding head 160. Each type and size of connector has a specific chamber volume and compressed length 235, 248 to properly compress the fitting onto the wire or cable without crushing or bending the connector. Therefore the compressed length 235, 248 is the space between the sliding head 160 and the body 100, which may be the cable cradle 190.

The uncompressed connector 300 is placed onto a wire or cable end 301, which then in turn is placed uncompressed into the tool in the corresponding compression chamber 170, 180 dimensioned for compressing that specific size and type of connecter. The sliding head 160, that may include a driver tip 260, 270 slides forward under pressure from the handle 140 driving the connector 300 onto the wire or cable 301 until the predetermined compressed length 235, 248 for that specific connector 300 is reached. The handle 140 is then raised allowing the sliding head 160 to be retracted if necessary and the completed compressed connector to be removed from the tool. If desired the operation can be performed on two different uncompressed connectors simultaneously speeding up the production process. It should also be noted that the same concept may be used on three, four, five or move connectors.

A method of affixing, adjoining, or attaching a cable connector to a wire may comprise the steps of: providing a body having a bottom surface, a first side and a second side, a handle attached to the body, a sliding head having a protruding component that may be slidably affixed to the body and is configured to be coupled with the handle, a first compression portion for receiving a driver tip for a connector of a first dimension, a second compression portion of the sliding head for receiving a driver tip for a connector of a second dimension larger than the first dimension, and a cable cradle affixed to the body, wherein includes a first portion and a second portion both residing substantially parallel with the bottom surface. The aforementioned tool described may allow for the quick attachment of different connectors onto wires without use of an adapter.

Where the tool has a properly sized receiving portion another step may be providing a cable connector and providing a wire to put on the connector. Moreover an additional step may be inserting, receiving, attaching, snapping, guiding, operably associating, or resting the cable connector and the wire onto the appropriately sized driver tip in the appropriate compression chamber of the body. Furthermore, another step may be compressing or condensing the connector onto the cable or wire by moving the sliding head to drive the cable connector onto the wire forming a connector cable. Still further, another step may be removing the connector cable from the body.

If desired two or a plurality of connectors could be compressed simultaneously or consecutively by providing a second wire and inserting the second cable connector and second the wire onto the appropriately sized driver tip in the body prior to compressing the handle. To aid in the process and for easier alignment then inserting the wire into the first portion of the cable cradle prior to compressing the handle is suggested. Another step may be the securing or adjoining of the tool onto a relatively flat work station to allow either one or two person operation. The operation of compressing cables may be faster with one person feeding, guiding, attaching or snapping uncompressed cables and wires into the compression chamber while the other operator actuates the handle. The operation additionally could be faster yet still by having a plurality of identical compression chambers to produce a plurality of connectors simultaneously on the same tool.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

I claim:

1. A multiple connector compression tool for use with multiple sized connectors and a cable, said compression tool comprising:

a body having a bottom surface, a first side and a second side;

an actuator movably affixed to the body;

a first compression chamber, positioned proximate a first side and configured for receiving a first cable connector of a first dimension;

a second compression chamber, positioned proximate a second side and configured for receiving a second cable connector of a second dimension, said second cable connector being a different dimension than the first cable connector; and a first cable receiving portion, operably associated with the first compression chamber, wherein when a coaxial cable is positioned in the first cable receiving portion, a connector of a first dimension may be compressed thereon by movement of the actuator; and a second cable receiving portion, operably associated with the second compression chamber, wherein when a coaxial cable is positioned in the second cable receiving portion, a connector of a first dimension may be compressed thereon by movement of the actuator.

2. The tool of claim 1 further comprising:

a handle, operably associated with the first compression chamber and the second compression chamber, wherein the handle is pivotally attached with respect to the bottom surface of the body;

a sliding head having a protruding component, wherein the protruding component of the sliding head may be both retained and movable within the body, wherein the protruding component extends from the sliding head and is configured to be coupled to the actuator and the handle; and a receiving portion within at least one side wall of the body that accepts the protruding component extending from the head.

3. The tool of claim 1 further comprising:

a hinge pivotally affixing the handle to the body.

4. The tool of claim 1 further comprising:

a first compressed length that corresponds to the first compression channel portion of the head.

5. The tool of claim 1 further comprising:

a second compressed length that corresponds to the second compression channel portion of the head.

6. The tool of claim 1 wherein the actuator is a toggle lever.

7. The tool of claim 1 wherein the actuator is a handle further comprising:

a sliding head coupled to the handle.

8. The tool of claim 1 further comprising:

a first driver tip for the first compression channel portion of the sliding head for receiving the connector of the first dimension.

9. The tool of claim 1 further comprising:

a second driver tip for the second compression channel portion of the sliding head for receiving the connector of the second dimension.

10. A universal tool for multiple connector sizes comprising:

a body having a bottom surface, a first side and a second side, each side having a guidance portion therein;

a handle pivotally attached to the body between the first side and the second side;

a sliding head having a protruding component, wherein the protruding component of the sliding head is both retained and movable within the guidance portion of the body;

a toggle lever operably coupled to the to the handle and the sliding head;

an first portion of the sliding head, for receiving a driver tip, for a connector of a first dimension;

a second portion of the sliding head, for receiving a driver tip, for a connector of a second dimension different than the first dimension; and a cable cradle having a first portion and a second portion, wherein the cradle is affixed to the body between the first side and the second side and the portions reside in a plane substantially parallel with the bottom surface.

11. The tool of claim 10 further comprising:

a bearing disposed over the protruding component of the sliding head.

12. The tool of claim 10 wherein the guidance portion is a groove.

13. The tool of claim 10 wherein a driver trip is permanently affixed within the sliding head.

14. The tool of claim 10 further comprising:

a first compressed length that corresponds to a first compression channel portion of the head.

15. The tool of claim 10 further comprising:

a second compressed length that corresponds to the second compression channel portion of the head.

16. The tool of claim 10 wherein the protruding component extending from the sliding head is a post.

* * * * *

UNITED STATES PATENT AND TRADEMARK OFFICE

CERTIFICATE OF CORRECTION

PATENT NO. : 7,299,542 B2
APPLICATION NO. : 11/301896
DATED : November 27, 2007
INVENTOR(S) : Montena It is certified that error appears in the above-identified patent and that said Letters Patent is hereby corrected as shown below:

In the Drawings
Drawing Sheet 5, delete the second "200" label (which is to the right of the first "200" label) and insert -- 205 --

Column 2
Line 10, delete "an" and insert -- a --

Column 3
Line 52, insert -- of -- between "retraction" and "the"

Column 4
Line 21, delete "of"

Column 8
Line 35, delete one set of "to the"
Line 37, delete "an" and insert -- a --

Signed and Sealed this

Twenty Second Day of April, 2008

JON W. DUDAS
*Director of the United States Patent and Trademark Office*